US010012308B2

(12) United States Patent
Song et al.

(10) Patent No.: US 10,012,308 B2
(45) Date of Patent: Jul. 3, 2018

(54) APPARATUS AND METHOD FOR CONTROLLING ELECTRIC OIL PUMP

(71) Applicants: Hyundai Motor Company, Seoul (KR); Kia Motors Corporation, Seoul (KR)

(72) Inventors: Sang Lok Song, Gyeonggi-do (KR); June Ho Lee, Seoul (KR); Jong Hyun Kim, Gyeonggi-do (KR); Young Chul Kim, Gyeonggi-do (KR); Hak Sung Lee, Gyeonggi-do (KR); Seung Jae Kang, Seoul (KR); Gyeong Cheol Kim, Daejeon (KR); Kyoung Joo Kim, Daejeon (KR); Yoh Han Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 16 days.

(21) Appl. No.: 15/201,462

(22) Filed: Jul. 3, 2016

(65) Prior Publication Data
US 2017/0268662 A1   Sep. 21, 2017

(30) Foreign Application Priority Data

Mar. 16, 2016 (KR) .................. 10-2016-0031440

(51) Int. Cl.
*F16H 61/02* (2006.01)
*F16H 61/00* (2006.01)
(Continued)

(52) U.S. Cl.
CPC ......... *F16H 61/0025* (2013.01); *B60K 6/365* (2013.01); *F16H 3/728* (2013.01);
(Continued)

(58) Field of Classification Search
CPC ............. F16H 57/0434; F16H 57/0447; F16H 61/0025; F16H 61/0031; B60W 10/30
See application file for complete search history.

(56) References Cited

U.S. PATENT DOCUMENTS

| 5,944,632 A * | 8/1999 | Hara ...................... B60W 10/08 |
| | | 477/156 |
| 6,769,502 B2 * | 8/2004 | Nakamori .............. B60K 6/365 |
| | | 180/65.25 |

(Continued)

FOREIGN PATENT DOCUMENTS

| JP | 2005-265167 A | 9/2005 |
| JP | 2009-096326 A | 5/2009 |

(Continued)

*Primary Examiner* — Justin Holmes
*Assistant Examiner* — David R Morris
(74) *Attorney, Agent, or Firm* — Mintz Levin Cohn Ferris Glovsky and Popeo, P.C.; Peter F. Corless

(57) ABSTRACT

An apparatus for controlling an electric oil pump (EOP) includes a controller calculating first revolutions per minute (RPM), second RPM and third RPM, the first RPM being EOP RPM required for control of a brake in a transmission, the second RPM being EOP RPM required for cooling of a plurality of motors, and the third RPM being EOP RPM required for lubrication of the plurality of motors, the controller comparing the second RPM with the third RPM and driving the EOP at an RPM obtained by adding the first RPM to the greater of the second RPM and the third RPM.

20 Claims, 2 Drawing Sheets

(51) Int. Cl.
*F16H 61/686* (2006.01)
*F16H 61/688* (2006.01)
*F16H 3/72* (2006.01)
*B60K 6/365* (2007.10)

(52) U.S. Cl.
CPC ....... *F16H 61/0202* (2013.01); *F16H 61/686* (2013.01); *F16H 61/688* (2013.01); *B60Y 2200/92* (2013.01); *B60Y 2400/78* (2013.01); *F16H 2061/0012* (2013.01); *Y10S 903/945* (2013.01)

(56) References Cited

U.S. PATENT DOCUMENTS

| | | | | |
|---|---|---|---|---|
| 6,805,647 | B2* | 10/2004 | Silveri | B60K 6/48 475/122 |
| 7,951,043 | B2* | 5/2011 | Reisch | F16H 57/0434 192/113.3 |
| 8,747,074 | B2* | 6/2014 | Jeong | B60K 6/48 417/16 |
| 9,109,692 | B2* | 8/2015 | Jeong | B60K 6/48 |
| 2002/0107103 | A1* | 8/2002 | Nakamori | B60K 6/365 475/116 |
| 2004/0063533 | A1* | 4/2004 | Silveri | B60K 6/48 475/116 |
| 2011/0135499 | A1* | 6/2011 | Lee | F04B 49/06 417/44.1 |
| 2012/0141297 | A1* | 6/2012 | Jeong | B60K 6/48 417/5 |
| 2014/0244087 | A1* | 8/2014 | Jeong | B60K 6/48 701/22 |
| 2016/0138708 | A1* | 5/2016 | Kim | F16H 61/12 701/62 |

FOREIGN PATENT DOCUMENTS

| | | |
|---|---|---|
| JP | 2013-100836 A | 5/2013 |
| KR | 2009-0129049 A | 12/2009 |
| KR | 2010-0062635 A | 6/2010 |
| KR | 2010-0095077 A | 8/2010 |
| KR | 2012-0140099 A | 12/2012 |
| KR | 2014-0070715 A | 6/2014 |

* cited by examiner

APPARATUS AND METHOD FOR CONTROLLING ELECTRIC OIL PUMP

CROSS-REFERENCE TO RELATED APPLICATION

This application claims under 35 U.S.C. § 119(a) the benefit of Korean Patent Application No. 10-2016-0031440, filed on Mar. 16, 2016 in the Korean Intellectual Property Office, the entire contents of which are incorporated by reference herein.

BACKGROUND

1. Field of the Invention

The present invention relates to an apparatus and method for controlling an electric oil pump, more particularly, to an apparatus and method capable of improving fuel efficiency of a vehicle by optimally controlling an electric oil pump.

2. Description of the Related Art

In order to more efficiently use the power of an engine and a motor, a hybrid vehicle equipped with a hybrid transmission configured by a combination of the engine, the motor and epicyclic gearing may be set to an electric vehicle mode, in which the vehicle is driven by the motor alone, when the vehicle starts or travels in a low-speed section, and to a power branching mode, in which the transmission operates as an electrically variable transmission (EVT), as the speed of the vehicle increases. The hybrid vehicle uses a finite gear ratio as used in a conventional transmission to obtain excellent power performance of the vehicle.

Systems based on the concept above are configured to implement an idle-stop function and maximize regenerative braking so as to improve fuel efficiency and power performance of the vehicle.

In addition, when the hybrid vehicle is driven by a motor generator alone, there is no possibility of generation of exhaust gases from the engine, and the engine can be driven at the point of optimum fuel efficiency. Accordingly, the hybrid vehicle is recognized as eco-friendly vehicle technology for improving fuel efficiency and lowering emissions.

A power transmission apparatus of such a hybrid vehicle is preferably simplified to implement various driving modes such that the driving modes are changed according to the driving situation of the vehicle to improve fuel efficiency of the vehicle through more efficient driving and to improve vehicle driving performance including acceleration.

FIG. 1 illustrates a layout of a transmission of a conventional hybrid vehicle. Referring to FIG. 1, an input shaft 20 connected to a motor 10 is provided with a brake 30.

Before the brake 30 is introduced into the input shaft 20, rotation of a motor generator is stopped through an external power supply source in order to perform overdrive running of the vehicle. However, such a drive method degrades vehicle efficiency and fuel efficiency due to persistent supply of power, and thus a layout for controlling the motor 10 with the brake 30 as shown in FIG. 1 has been provided.

Herein, the brake 30 is operated by hydraulic control through an electric oil pump (EOP). The EOP may serve to provide hydraulic pressure necessary for the transmission brake and to supply oil which is needed to cool and lubricate the motor. However, for the conventional hybrid vehicle to which both the EOP and MOP are applied, technology for generating hydraulic pressure for control of the transmission brake and precisely calculating and controlling the RPM of the EOP needed to cool and lubricate the motor is provided.

The features of the background art described above are merely provided to provide further understanding of the background of the present invention, and should not be construed as suggesting that the present invention corresponds to conventional technology well known to those skilled in the art.

SUMMARY

Therefore, the present invention provides an apparatus and a control method for implementing driving of an electric oil pump (EOP) with optimum efficiency by providing hydraulic pressure to a transmission and accurately calculating and applying a driving force of the electric oil pump which is needed to cool and lubricate a motor.

In accordance with the present invention, tan apparatus for controlling an electric oil pump (EOP) includes a controller configured to calculate first revolutions per minute (RPM), second RPM and third RPM, the first RPM being EOP RPM required for control of a brake in a transmission, the second RPM being EOP RPM required for cooling of a plurality of motors, and the third RPM being EOP RPM required for lubrication of the plurality of motors, the controller comparing the second RPM with the third RPM, and the controller driving the EOP at an RPM obtained by adding the first RPM to the greater of the second RPM and the third RPM.

The first RPM may be calculated based on an oil temperature and a line pressure of the transmission.

The second RPM may be calculated by subtracting EOP RPM corresponding to the amount of oil supplied by a mechanical oil pump (MOP) from a value calculated based on an oil temperature and a motor temperature.

The motor temperature may have a temperature value of a motor having the highest temperature between the motors.

The EOP RPM corresponding to the amount of oil supplied by the MOP may be calculated by multiplying MOP RPM by an MOP capacity multiplied by an MOP/EOP efficiency ratio divided by an EOP capacity.

The MOP/EOP efficiency ratio may be calculated based on the oil temperature and a size of a cooling flow path.

The third RPM may be calculated by subtracting EOP RPM corresponding to the amount of oil supplied by a mechanical oil pump (MOP) from a value calculated based on an oil temperature and a motor power or on the oil temperature and an engine power.

The motor power may be set to a power value of a motor having a highest drive power between the motors, wherein the controller may calculate the third RPM using the greater one of the motor power and the engine power.

The EOP RPM corresponding to the amount of oil supplied by the MOP may be calculated by multiplying MOP RPM by an MOP capacity multiplied by an MOP/EOP efficiency ratio divided by an EOP capacity.

The MOP/EOP efficiency ratio may be calculated based on an oil temperature and a size of a lubrication flow path.

According to a method of controlling an electric oil pump configured as described above, optimum driving of the electric oil pump may be implemented by preventing the electric oil pump from being unnecessarily driven. Accordingly, fuel efficiency of the vehicle may be improved.

For example, a method for controlling an electric oil pump (EOP) can include steps of: calculating, by a controller, first revolutions per minute (RPM), second RPM and third RPM, the first RPM being EOP RPM required for control of a brake in a transmission, the second RPM being EOP RPM required for cooling of a plurality of motors, and the third RPM being EOP RPM required for lubrication of the plurality of motors; comparing, by the controller, the second RPM with the third RPM; and driving, by the controller, the EOP at an RPM obtained by adding the first RPM to the greater of the second RPM and the third RPM.

A non-transitory computer readable medium containing program instructions executed by a processor can include: program instructions that calculate first revolutions per minute (RPM), second RPM and third RPM, the first RPM being EOP RPM required for control of a brake in a transmission, the second RPM being EOP RPM required for cooling of a plurality of motors, and the third RPM being EOP RPM required for lubrication of the plurality of motors; program instructions that compare the second RPM with the third RPM; and program instructions that drive the EOP at an RPM obtained by adding the first RPM to the greater of the second RPM and the third RPM.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Reference will now be made in detail to the preferred embodiments of the present invention, examples of which are illustrated in the accompanying drawings. Wherever possible, the same reference numbers will be used throughout the drawings to refer to the same or like parts.

Figure 1:
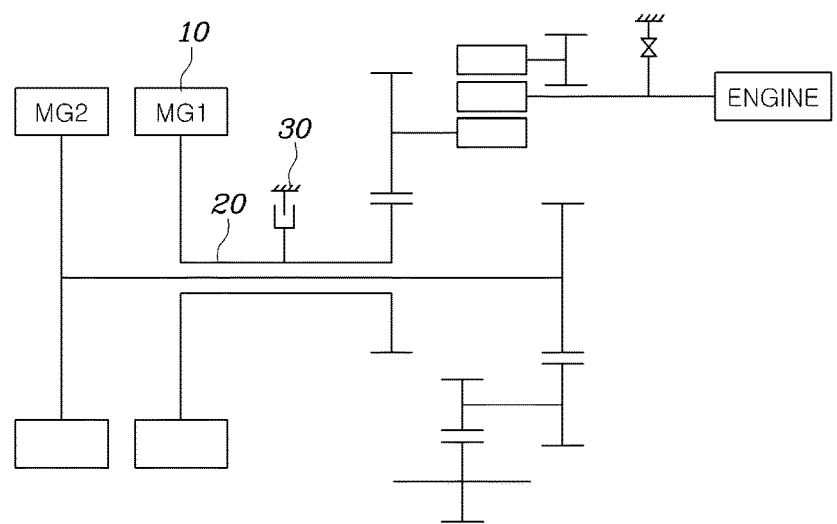
FIG. 1 (RELATED ART) is a diagram illustrating a layout of a conventional transmission.
Figure 2:
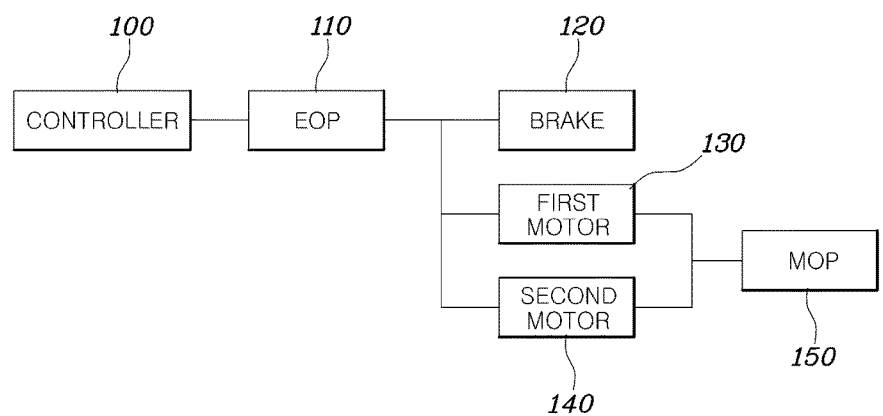
FIG. 2 is a block diagram illustrating an electric oil pump control apparatus according to an embodiment of the present invention.

FIG. 2 is a block diagram illustrating an electric oil pump control apparatus according to an embodiment of the present invention. Referring to FIG. 2, the electric oil pump control apparatus may include an electric oil pump (EOP) 110 configured to supply transmission oil to a brake 120, which is provided in a transmission, a first motor 130 and a second motor 140, a mechanical oil pump (MOP) 150 configured to supply separate oil to the first motor 130 and the second motor 140, and a controller 100 configured to calculate revolutions per minute (RPM) for driving the EOP 110 and drive the EOP 110 according to the calculated RPM. Herein, the EOP 110 is configured to operate according to an electrical signal of the controller 100. Operations and features of the electric oil pump control apparatus described above are described in detail below through a control method for the same.

Figure 3:
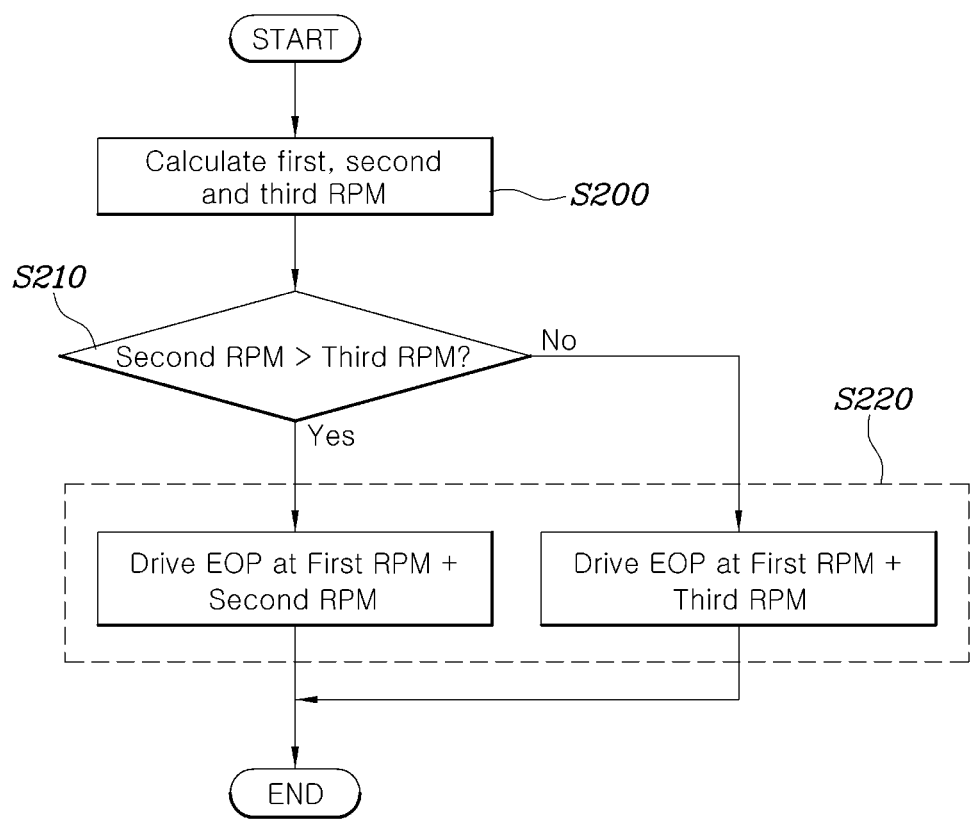
FIG. 3 is a flowchart illustrating a method of controlling an electric oil pump according to an embodiment of the present invention.

FIG. 3 is a flowchart illustrating a method of controlling an electric oil pump according to an embodiment of the present invention. Referring to FIGS. 2 and 3, a method for controlling the electric oil pump may include the controller 100 calculating first RPM corresponding to EOP RPM required for control of the brake 120 provided in the transmission, second RPM corresponding to EOP RPM required for cooling of a plurality of motors 130 and 140, and third RPM corresponding to EOP RPM required for lubrication of the motors 130 and 140 (S200); the controller 100 comparing the second RPM with the third RPM after the calculating step S200 (S210); and the controller 100 driving the EOP 110 at an RPM obtained by adding the first RPM to the greater of the second RPM and the third RPM produced as a result of the comparing step S210 (S220).

That is, the EOP 110 connected to the transmission needs to be driven to generate hydraulic pressure necessary for driving of the brake 120, which is connected to one of the plurality of motors, namely, the first motor 130 and second motor 140 to implement overdrive running of the hybrid vehicle.

Accordingly, the controller 100 preferably determines whether the brake 120 needs to be driven, and then if the brake 120 needs to be driven, the controller 100 calculates the first RPM corresponding to the EOP RPM necessary for driving of the brake 120 and drives the EOP 110 according to the calculated RPM.

The first RPM may be calculated based on the oil temperature and the line pressure of the transmission. Specifically, the hydraulic pressure needed to drive the transmission brake 120 depends on the oil temperature and transmission line pressure. For example, viscosity of the oil increases as the temperature decreases. Thus, if the sensed oil temperature is low, the first RPM may be increased. Further, when the transmission line pressure is low, the hydraulic pressure to be generated for the brake 120 is high. Therefore, as the transmission line pressure decreases, the first RPM will increase.

In particular, when the brake 120 needs to be operated to implement overdrive of the vehicle, the controller 100 may calculate the RPM of the EOP 110 according to a map conforming to the oil temperature and the transmission line pressure.

In the calculating step (S200), the controller 100 also needs to calculate the second RPM and third RPM, which are EOP RPMs required for cooling and lubrication of the first motor 130 and second motor 140. That is, the EOP 110 may be connected to the first motor 130 and second motor 140 via a separate cooling flow path and lubrication flow path to cool and lubricate the plurality of motors 130 and 140.

First, the second RPM may be calculated by subtracting EOP RPM corresponding to the amount of oil supplied by the mechanical oil pump (MOP) 150 from a value calculated based on the oil temperature and the motor temperature.

For example, if the measured motor temperature is high, the amount of oil needed to cool the motors 130 and 140 may increase. Accordingly, the second RPM may be calculated in proportion to the motor temperature.

Particularly, the motor temperature may be set to the temperature of a motor having the higher temperature of the motors 130 and 140. That is, in calculating the second RPM, a value calculated based on the oil temperature and the motor temperature is the RPM of the EOP 110 for supplying an amount of oil needed to complete cooling of all the motors 130 and 140. By using the temperature value of a motor having a higher temperature than the other one in calculating the second RPM, the motors 130 and 140 may be sufficiently cooled by the EOP 110.

The EOP RPM corresponding to the amount of oil supplied by the MOP 150 may be calculated by multiplying the MOP RPM by MOP capacity multiplied by MOP/EOP efficiency ratio divided by EOP capacity. Herein, the MOP/EOP efficiency ratio may be calculated based on the oil temperature and the size of the cooling flow path. That is, the MOP/EOP efficiency ratio may change according to a difference in size between an MOP side cooling flow path and an EOP side cooling flow path. For example, when the size of the cooling flow path of the MOP side is fixed, the MOP/EOP efficiency ratio may increase as the size of the cooling flow path of the EOP side increases.

In addition, since the MOP 150 is driven by the engine or a motor, the motors 130 and 140 are cooled in proportion to an extent to which the MOP 150 is driven. However, there is a difference between the RPM of the MOP 150 and the RPM of EOP 110 according to the amount of oil, and thus the second RPM cannot be calculated by MOP RPM alone.

Accordingly, the EOP RPM corresponding to the amount of oil supplied to the motors 130 and 140 by driving the MOP 150 needs to be calculated. The equation for calculation of the second RPM is summarized below.

$$\text{Second RPM} = \left[ \text{Value calculated by oil temperature and motor} \right.$$

$$\left. \text{temperature} - \left( MOP \text{ RPM} \times \frac{MOP \text{ capacity}}{EOP \text{ capacity}} \times EOP/MOP \text{ efficiency ratio} \right) \right]$$

Equation 1

Herein, the MOP RPM may be calculated based on the RPM of a motor connected to the MOP 150 between the motors 130 and 140. If the RPM of the motor connected to the MOP 150 is less than 0, the second RPM is set to a value calculated based on the oil temperature and motor temperature.

Meanwhile, the controller 100 calculates the third RPM which is EOP RPM for supply of an amount of oil required for lubrication of the motors 130 and 140 through the EOP 110. The third RPM may be calculated by subtracting the EOP RPM corresponding to the amount of oil supplied by the MOP 150 from a value calculated based on the oil temperature and the motor power or on the oil temperature and the engine power. Herein, the motor power or engine power must be taken into consideration in calculating the third RPM because the amount of oil required for lubrication of the motors 130 and 140 increases as the value of the motor power or engine power increases.

Particularly, the motor power may be set to a power value of a motor having a higher drive power between the motors 130 and 140, and the controller 100 may calculate the third RPM using the greater one of the motor power and the engine power.

That is, the third RPM is calculated based on the highest EOP RPM according to drive powers of the motors 130 and 140 and the engine. Accordingly, shortage of oil necessary for lubrication of the motors 130 and 140 may be prevented.

The EOP RPM corresponding to the amount of oil supplied by the MOP 150 may be calculated by multiplying the MOP RPM by MOP capacity multiplied by MOP/EOP efficiency ratio divided by EOP capacity. Herein, the MOP/EOP efficiency ratio may be calculated based on the oil temperature and the size of the lubrication flow path. The equation for calculation of the third RPM is summarized below.

$$\text{Third RPM} = \left[ \max(\text{Value calculated by oil temperature and motor power or by oil temperature and engine power}) - \left( MOP \text{ RPM} \times \frac{MOP \text{ capacity}}{EOP \text{ capacity}} \times EOP/MOP \text{ efficiency ratio} \right) \right]$$

Equation 2

Herein, the MOP RPM may be calculated based on the RPM of a motor connected to the MOP 150 between the motors 130 and 140. If the RPM of the motor connected to the MOP 150 is less than 0, the third RPM is set to a value calculated based on the oil temperature and motor temperature.

In summary, in the calculating step (S200), the controller 100 may precisely calculate the RPM of the EOP 110 which is necessary for control of the transmission brake 120 and the RPM of the EOP 110 necessary for cooling or lubrication of the motors 130 and 140, thereby implementing optimum control of the EOP 110. Thereby, the fuel efficiency of the vehicle may be improved.

In the calculating step (S200), the controller 100 may compare the second RPM which is the EOP RPM necessary for cooling of the motors 130 and 140 with the third RPM which is EOP RPM necessary for lubrication of the motors 130 and 140 (S210), and calculate RPM for driving the EOP 110 by adding the first RPM to the greater of the second RPM and the third RPM. Thereby, the controller 100 may precisely control formation of hydraulic pressure for control of the transmission brake 120 and cooling and lubrication of the motors.

As is apparent from the above description, the present invention provides an apparatus and a method of controlling an electric oil pump configured as described above. Thereby, optimum driving of the electric oil pump may be implemented by preventing the electric oil pump from being unnecessarily driven. Accordingly, fuel efficiency of the vehicle may be improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling an electric oil pump (EOP), the apparatus comprising:
a controller configured to calculate first revolutions per minute (RPM), second RPM and third RPM, the first RPM being EOP RPM required for control of a brake in a transmission, the second RPM being EOP RPM required for cooling of a plurality of motors, and the third RPM being EOP RPM required for lubrication of the plurality of motors, the controller configured to compare the second RPM with the third RPM, and the controller configured to drive the EOP at an RPM obtained by adding the first RPM to the greater of the second RPM and the third RPM.

2. The apparatus according to claim 1, wherein the first RPM is calculated based on a map correlating an oil temperature and a line pressure of the transmission with hydraulic pressure necessary for driving the brake.

3. The apparatus according to claim 1, further comprising a mechanical oil pump (MOP) that supplies oil to the plurality of motors, wherein the second RPM is calculated by subtracting EOP RPM proportional to the amount of oil supplied by the mechanical oil pump (MOP) from a value calculated based on an oil temperature and a motor temperature, and wherein the second RPM is obtained from an equation:

$$Second\ RPM = \Big[\text{Value calculated by oil temperature and motor temperature} - \Big(MOP\ RPM \times \frac{MOP\ \text{capacity}}{EOP\ \text{capacity}} \times EOP/MOP\ \text{efficiency ratio}\Big)\Big].$$

4. The apparatus according to claim 3, wherein the motor temperature has a temperature value of a motor having the highest temperature between the motors.

5. The apparatus according to claim 3, wherein the EOP RPM proportional to the amount of oil supplied by the MOP is calculated by multiplying MOP RPM by an MOP capacity multiplied by an MOP/EOP efficiency ratio divided by an EOP capacity.

6. The apparatus according to claim 5, wherein the MOP/EOP efficiency ratio is calculated based on the oil temperature and a size of an MOP side cooling flow path and an EOP side cooling flow path.

7. The apparatus according to claim 1, further comprising a mechanical oil pump (MOP) that supplies oil to the plurality of motors, wherein the third RPM is calculated by subtracting EOP RPM proportional to the amount of oil supplied by the mechanical oil pump (MOP) from a value calculated based on an oil temperature and a motor power or on the oil temperature and an engine power, and wherein the third RPM is obtained from an equation:

$$Third\ RPM = \Big[\max(\text{Value calculated by oil temperature and motor power or by oil temperature and engine power}) - \Big(MOP\ RPM \times \frac{MOP\ \text{capacity}}{EOP\ \text{capacity}} \times EOP/MOP\ \text{efficiency ratio}\Big)\Big].$$

8. The apparatus according to claim 7, wherein the motor power is set to a power value of a motor having a highest drive power between the motors,
wherein the controller calculates the third RPM using the greater one of the motor power and the engine power.

9. The apparatus according to claim 7, wherein the EOP RPM proportional to the amount of oil supplied by the MOP is calculated by multiplying MOP RPM by an MOP capacity multiplied by an MOP/EOP efficiency ratio divided by an EOP capacity.

10. The apparatus according to claim 9, wherein the MOP/EOP efficiency ratio is calculated based on the oil temperature and a size of an MOP side cooling flow path and an EOP side cooling flow path.

11. A method for controlling an electric oil pump (EOP), comprising the steps of:
calculating, by a controller, first revolutions per minute (RPM), second RPM and third RPM, the first RPM being EOP RPM required for control of a brake in a transmission, the second RPM being EOP RPM required for cooling of a plurality of motors, and the third RPM being EOP RPM required for lubrication of the plurality of motors;
comparing, by the controller, the second RPM with the third RPM; and
driving, by the controller, the EOP at an RPM obtained by adding the first RPM to the greater of the second RPM and the third RPM.

12. The method according to claim 11, wherein the first RPM is calculated based on a map correlating an oil temperature and a line pressure of the transmission with hydraulic pressure necessary for driving the brake.

13. The method according to claim 11, further comprising a mechanical oil pump (MOP) that supplies oil to the plurality of motors, wherein the second RPM is calculated by subtracting EOP RPM proportional to the amount of oil supplied by the mechanical oil pump (MOP) from a value calculated based on an oil temperature and a motor temperature, and wherein the second RPM is obtained from an equation:

$$Second\ RPM = \Big[\text{Value calculated by oil temperature and motor temperature} - \Big(MOP\ RPM \times \frac{MOP\ \text{capacity}}{EOP\ \text{capacity}} \times EOP/MOP\ \text{efficiency ratio}\Big)\Big].$$

14. The method according to claim 13, wherein the motor temperature has a temperature value of a motor having the highest temperature between the motors.

15. The method according to claim 13, wherein the EOP RPM proportional to the amount of oil supplied by the MOP is calculated by multiplying MOP RPM by an MOP capacity multiplied by an MOP/EOP efficiency ratio divided by an EOP capacity.

16. The method according to claim 15, wherein the MOP/EOP efficiency ratio is calculated based on the oil temperature and a size of an MOP side cooling flow path and an EOP side cooling flow path.

17. The method according to claim 11, further comprising a mechanical oil pump (MOP) that supplies oil to the plurality of motors, wherein the third RPM is calculated by subtracting EOP RPM proportional to the amount of oil supplied by the mechanical oil pump (MOP) from a value calculated based on an oil temperature and a motor power or on the oil temperature and an engine power, and wherein the third RPM is obtained from an equation:

$$\text{Third } RPM = \Big[\max(\text{Value calculated by oil temperature and motor power or by oil temperature and engine power}) -$$

$$\Big(MOP\ RPM \times \frac{MOP\ \text{capacity}}{EOP\ \text{capacity}} \times EOP/MOP\ \text{efficiency ratio}\Big)\Big].$$

18. The method according to claim 17, wherein the motor power is set to a power value of a motor having a highest drive power between the motors,
wherein the controller calculates the third RPM using the greater one of the motor power and the engine power.

19. The method according to claim 17, wherein the EOP RPM proportional to the amount of oil supplied by the MOP is calculated by multiplying MOP RPM by an MOP capacity multiplied by an MOP/EOP efficiency ratio divided by an EOP capacity.

20. The method according to claim 19, wherein the MOP/EOP efficiency ratio is calculated based on the oil temperature and a size of an MOP side cooling flow path and an EOP side cooling flow path.

* * * * *